US006962250B2

(12) United States Patent
Van Liempd et al.

(10) Patent No.: US 6,962,250 B2
(45) Date of Patent: Nov. 8, 2005

(54) CONVEYOR AND METHOD FOR CONVEYING PRODUCTS

(75) Inventors: Albertus Cornelis Hendrikus Van Liempd, Veghel (NL); Marinus Johannes Henricus Van Den Elzen, Veghel (NL); Pieter Franciscus Karel Damen, Veghel (NL)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 10/432,673

(22) PCT Filed: Nov. 15, 2001

(86) PCT No.: PCT/NL01/00831

§ 371 (c)(1),
(2), (4) Date: Jan. 7, 2004

(87) PCT Pub. No.: WO02/42186

PCT Pub. Date: May 30, 2002

(65) Prior Publication Data

US 2004/0094388 A1    May 20, 2004

(30) Foreign Application Priority Data

Nov. 23, 2000 (EP) .................................. 00204175

(51) Int. Cl.[7] ........................................... B65G 47/26
(52) U.S. Cl. ............. 198/457.06; 198/440; 198/457.03
(58) Field of Search ................................ 198/588, 812, 198/426, 436, 440, 457.03, 457.06, 597

(56) References Cited

U.S. PATENT DOCUMENTS

| 2,389,696 | A |   | 11/1945 | Stiles ........................... 198/32 |
| 3,093,236 | A |   | 6/1963  | McLaughlin ................ 198/185 |
| 3,429,416 | A | * | 2/1969  | Provost et al. .............. 198/433 |
| 3,584,729 | A |   | 6/1971  | Ivy ............................ 198/165 |
| 4,219,112 | A | * | 8/1980  | Loewenthal ................ 198/433 |
| 4,252,232 | A | * | 2/1981  | Beck et al. ................. 198/443 |
| 4,311,230 | A | * | 1/1982  | Crawford et al. ....... 198/457.03 |
| 5,042,636 | A | * | 8/1991  | Underwood ................ 198/440 |
| 5,655,643 | A |   | 8/1997  | Bonnet ................... 198/370.08 |
| 5,988,356 | A | * | 11/1999 | Bonnet ................... 198/370.08 |

FOREIGN PATENT DOCUMENTS

DE           965 627        6/1957

* cited by examiner

*Primary Examiner*—James R. Bidwell
(74) *Attorney, Agent, or Firm*—Fitzpatrick, Cella, Harper & Scinto

(57) ABSTRACT

A conveyor for conveying products (2), comprising a conveyor belt (1) and a moving endless guiding element (12) which includes a straight portion (4) extending between two guide wheels (5, 6), which straight portion (4) is capable of guiding products (2) that are present on the conveyor belt in lateral direction towards and over the edge of the conveyor belt, wherein the distance between the two guide wheels is adjustable.

10 Claims, 2 Drawing Sheets

CONVEYOR AND METHOD FOR CONVEYING PRODUCTS

Figure 1:
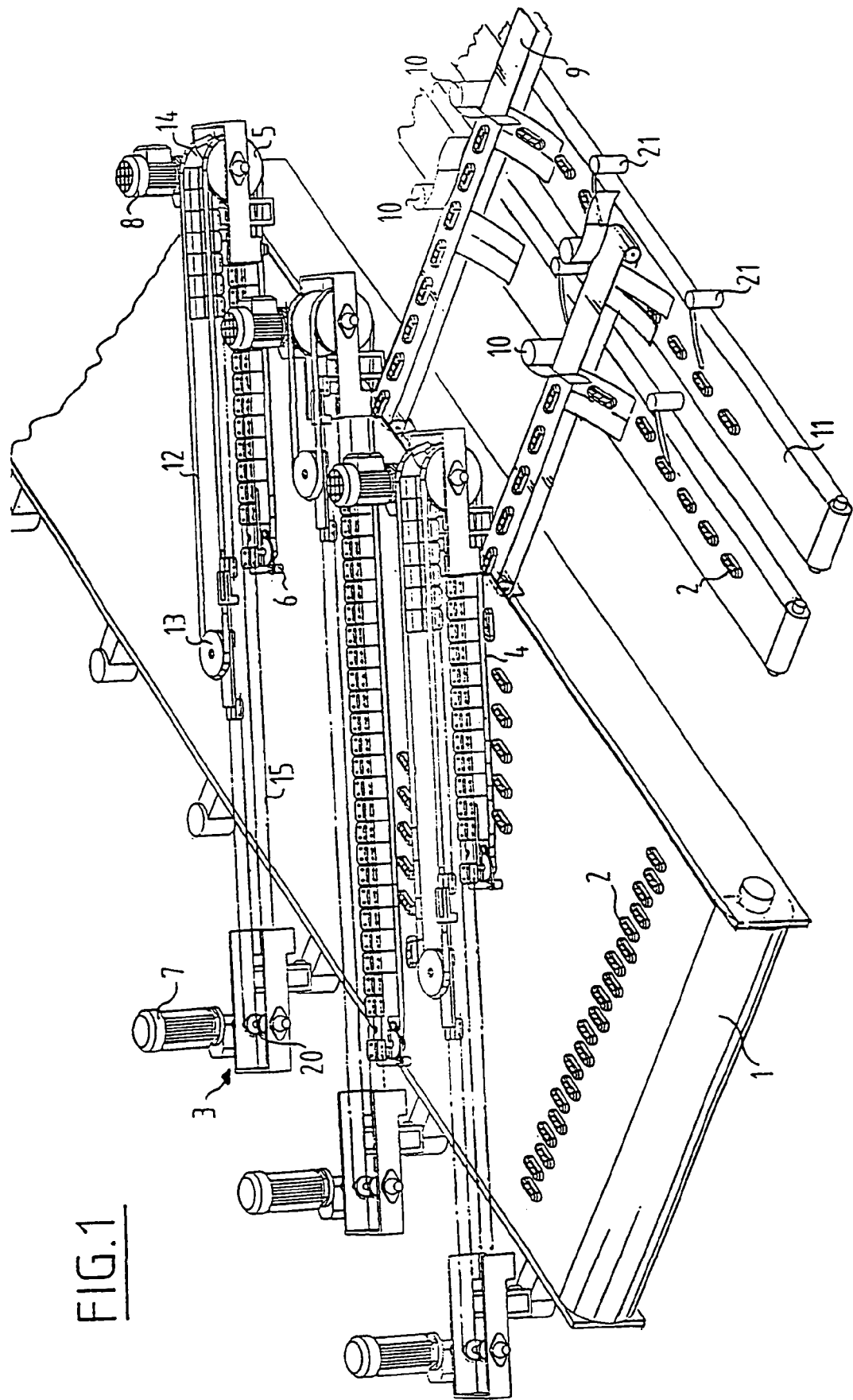

The invention relates to a conveyor for conveying products, comprising a conveyor belt and a moving endless guiding element which includes a straight portion extending between two guide wheels, which straight portion is capable of guiding products that are present on the conveyor belt in lateral direction towards and over the edge of the conveyor belt.

Such a conveyor is known, it is used for dividing a flow of products on the conveyor belt into several subflows. The guiding device of this known conveyor essentially comprises two guide wheels, over which an endless rope is tensioned. One of the two guide wheels is driven by a motor, so that the rope guides the products towards the edge of the conveyor belt at a specific velocity. Furthermore, one of the two guide wheels of the guiding device is disposed an adjustable distance away from the edge above the conveyor belt, whereby the guiding device extends to beside conveyor belt. By varying the distance from the conveyor belt it is possible to adjust the amount of products that is guided by the guiding device of the conveyor belt. Since the angle of the direction of transport of the guiding device with respect to the direction of transport of the conveyor belt has an optimum in relation to the movement of the product, it is preferred to maintain a constant value for said angle. With the known conveyor the adjustment of the amount of products to be guided off the conveyor belt is effected by moving the guiding device along its own longitudinal axis, therefore. The drawback of this is, however, that in the extreme position, in which hardly any products are guided off the conveyor belt, if at all, the guiding device extends laterally from the conveyor belt over a width that corresponds to the width of the conveyor belt. As a result, the conveyor takes up a great deal of space.

The object of the invention is to provide an inexpensive, simple, efficient and/or reliable conveyor of the kind referred to in the introduction, which takes up little space.

In order to accomplish that objective, the distance between the two guide wheels is adjustable. As a result, the straight portion of the guiding element, which extends between the guide wheels and which guides the products off the conveyor belt, has a variable length, which makes it possible to lead the portion of the guiding element that is not being used for guiding products off the conveyor belt in another direction, in such a manner that the guiding element no longer extends as far laterally as described above.

Preferably, a first guide wheel is disposed at a fixed location beside, and preferably near the edge of the conveyor belt, seen from above. The second guide wheel is preferably disposed at an adjustable location above the conveyor belt. The location of the second guide wheel thereby determines the amount of products that are guided off the conveyor belt.

Preferably, the larger part of the guiding element is positioned above the conveyor belt, irrespective of the adjusted distance between the guide wheels. As a result, the guiding element hardly projects outside the conveyor belt so that a the most compact conveyor possible is obtained. In one preferred embodiment this is accomplished by leading back the non-guiding portion of the guiding element to a position above the guiding portion thereof. Alternatively, said portion can also be led back to a position beside said guiding portion.

The guiding element is preferably tensioned over at least two fixed guide wheels and two adjustable guide wheels. The two adjustable guide wheels are preferably interconnected by a cable which is passed over at least one adjusting wheel. In one specific embodiment the cable is an endless cable, which is passed over the adjusting wheel on the one hand and a freely rotating wheel near the fixed guiding wheels on the other hand. The term cable must be given a wide interpretation in this context, it also comprises a chain, a wire or a belt, for example. The adjusting wheel is preferably driven by a motor, in particular a positioning motor, so that the aforesaid distance between the two guide wheels, and consequently the amount of products being guided off the conveyor belt, can be set accurately and quickly.

Preferably, the adjustable guide wheels are essentially positioned between the fixed guide wheels on the one hand and the adjusting wheel on the other hand. Thus a compact, elongated guiding element having a fixed length equal to the distance between the fixed guide wheels and the adjusting wheel is obtained.

The invention is especially advantageous when several guiding elements extend above the conveyor belt so as to divide the flow of products to be conveyed into several subflows. The distance from the former adjustable guide wheel to the aforesaid edge of the conveyor belt is increased in small steps, seen in downstream direction, so that a new (adjustable) part of the products is guided off the conveyor belt with each respective distance.

The invention furthermore relates to a method for conveying products, wherein a straight portion of a moving endless guiding element, which extends between two guide wheels, guides products that are present on a conveyor belt in lateral direction towards and over the edge of said conveyor belt, and wherein the distance between the two guide wheels is adjusted for the purpose of regulating the amount of products being guided towards and over the edge of the conveyor belt.

Figure 2:
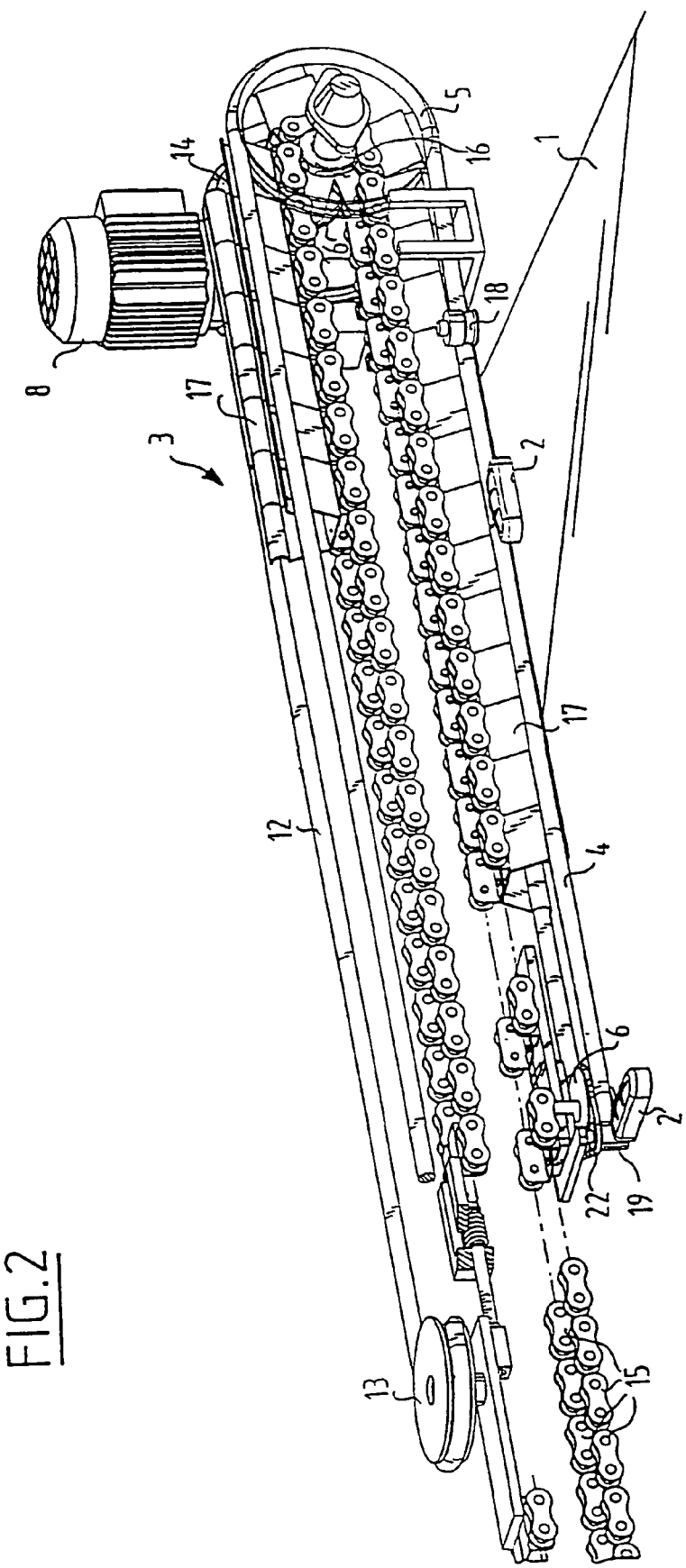

The invention will now be explained in more detail by means of an exemplary embodiment as shown in the figures, wherein:

FIG. 1 is a perspective view of a conveyor; and
FIG. 2 is a perspective view of a detail of the conveyor of FIG. 1.

Referring to FIG. 1 a conveyor for conveying products comprises a moving endless conveyor belt 1, on which the products, in this case candies 2 to be packaged, are supplied in bulk, whereby the candies are distributed more or less at random over the width of the conveyor belt. In order to divide said bulk flow into several small flows, so that they can be fed to a packaging apparatus in a suitable manner, the conveyor furthermore comprises a number of guiding devices 3. Said guiding devices 3 are disposed in mutually parallel relationship, at an angle of about 50° to the direction of movement of the conveyor belt and parallel to the plane of the conveyor belt. Each guiding device 3 comprises a moving endless rope 12, a straight guiding portion 4 of which extends between a fixed guide wheel 5, which is disposed at a fixed location beside the conveyor belt, and a linearly movable and adjustable guide wheel 6. As will be explained in more detail yet, the adjustment of the position of the guide wheel 6 takes place by means of a positioning motor 7.

Guiding portion 4 is disposed at a height above conveyor belt 1 that is smaller than the height of candies 2, so that the candies cannot move under said guiding portion and run against said guiding portion 4. The candies 2 can move under the portion of the guiding device 3 where guiding portion 4 does not extend. The endless rope 12 is driven by means of fixed guide wheel 5, which is connected to an electric motor 8, at a speed which has a component in the direction of the movement of conveyor belt 1 which is approximately equal to the speed of that conveyor belt 1, wherein guiding portion 4 moves at an angle towards the side of conveyor belt 1, so that the candies 2 that run against the guiding portion 4 are deflected in lateral direction over the edge of the conveyor belt 1. The exact speed of endless rope 12 is adjustable depending on the volume of candies 2 that has to be taken off.

The manner of dividing the bulk flow of candies 2 into several small flows is determined by the positions of guide wheels 6. Generally the distance between the movable guide wheels 6 and the fixed guide wheels 5 is increased in small steps, seen in downstream direction. The volume of a deflected flow is thereby determined by the incremental lateral distance between two successive movable guide wheels 6.

After the candies 2 have been guided over the edge of conveyor belt 1, they are transported in lateral direction by second conveyor belts 9. Present above conveyor belts 9 are rotatable guide elements 10 as shown in FIG. 2, which ensure that the candies 2 are guided to a selected third conveyor belt 11.

FIGS. 1 and 2 show the manner in which rope 12, part of which forms guiding portion 4, is tensioned and moved. Rope 12 is passed over four guide wheels, viz. the movable guide wheel 6, fixed guide wheel 5, a second movable guide wheel 13 and a second fixed guide wheel 14, which is driven by an electric motor 8. The two movable guide wheels 6, 13 are furthermore connected to two endless chains 15, which are passed on the one hand over chain wheels 16, which are disposed co-axially with the fixed guide wheels 5, 14, and on the other and over adjusting chain wheels 20, which are driven by the positioning motor 7, in such a manner that the distance between the fixed guide wheel 5 and the movable guide wheel 6 can be adjusted by the positioning motor 7.

Pusher elements 17 are present on chains 15, along the length where also rope 12 extends, a pushing portion of which is positioned behind and near rope 12 in order to prevent rope 12, and in particular the guiding portion 4 thereof, being pushed inwards by the candies 4, which might happen in particular when the distance between the fixed guide wheel 5 and the movable guide wheel 6 is large. The rotatable shaft 18 that pushes against the guiding portion 4 of rope 12 makes it possible for rope 12 to be deflected outwards near guide wheels 5 and 14, since otherwise the pusher elements 17 would not be able to move between the guide wheels 5 and 14.

Furthermore a rotatable shaft 19 having a relatively small radius is disposed near movable guide wheel 6, which shaft ensures that the end of guiding portion 4 is sharply defined, resulting in a well defined separation of the flow of candies 2 into several subflows. The shaft 19 is driven by a string 22 which is passed over guide wheel 6.

The present invention has been described above by means of a preferred embodiment. Many embodiments and variants will be apparent to those skilled in the art, however, and consequently the scope of the present invention shall not be limited by the details of the above description.

What is claimed is:

1. A conveyor for conveying products (2), comprising a conveyor belt (1) and a moving endless guiding element (12) which includes a straight portion (4) extending between two guide wheels (5, 6), which straight portion (4) is capable of guiding products (2) that are present on the conveyor belt (1) in lateral direction towards and over the edge of the conveyor belt (1), wherein the distance between the two guide wheels (5, 6) is adjustable for the purpose of regulating the amount of products (2) being guided towards and over the edge of the conveyor belt, a first one (5) of said two guide wheels being disposed beside the conveyor belt (1), seen from above, and the second one (6) of said guide wheels being disposed over the conveyor belt (1), at an adjustable location between the two edges of the conveyor belt, seen from above.

2. A conveyor according to claim 1, wherein a first guide wheel (5) is disposed at a fixed location beside the conveyor belt (1), seen from above.

3. A conveyor according to claim 1 or 2, wherein a larger part of the guiding element (12) is positioned above the conveyor belt (1), irrespective of the adjusted distance between the guide wheels (5, 6).

4. A conveyor according to claim 1 or 2, wherein said guiding element (12) is tensioned over at least two fixed guide wheels (5, 14) and two adjustable guide wheels (6, 13).

5. A conveyor according to claim 4, wherein the two adjustable guide wheels (6, 13) are interconnected by a cable (15) which is passed over at least one adjusting wheel (20).

6. A conveyor according to claim 5, wherein the adjusting wheel (20) is driven by a motor (7).

7. A conveyor according to claim 5, wherein the adjustable guide wheels (6, 13) are essentially positioned between the fixed guide wheels (5, 14) on the one hand and the adjusting wheel (20) on the other hand.

8. A conveyor according to claim 1 or 2, wherein at least one guide wheel (14) is driven by a motor (8).

9. A conveyor according to claim 1 or 2, wherein several guiding elements (12) extend above the conveyor belt (1) so as to divide the flow of products (2) to be conveyed into several subflows.

10. A method for conveying products (2), wherein a straight portion (4) of a moving endless guiding element (12), which extends between two guide wheels (5, 6), guides products (2) that are present on a conveyor belt (1) in lateral direction towards and over the edge of said conveyor belt (1), wherein the distance between the two guide wheels (5, 6) is adjusted for the purpose of regulating the amount of products (2) being guided towards and over the edge of the conveyor belt (1), a first one (5) of said two guide wheels being disposed beside the conveyor belt (1) at a laterally fixed location, seen from above, and the second one (6) of said guide wheels being disposed over the conveyor belt (1) and being moved between the two edges of the conveyor belt, seen from above.

* * * * *